United States Patent
Gould et al.

(10) Patent No.: US 7,049,352 B2
(45) Date of Patent: May 23, 2006

(54) AQUEOUS COATING COMPOSITIONS

(75) Inventors: Alan Jack Gould, Holland (NL); Jan Bouman, Holland (NL); Rajasingham Satgurunathan, Holland (NL)

(73) Assignee: Avecia BV, Waalwijk (NL)

( * ) Notice: Subject to any disclaimer, the term of this patent is extended or adjusted under 35 U.S.C. 154(b) by 79 days.

(21) Appl. No.: 10/488,040

(22) PCT Filed: Sep. 26, 2002

(86) PCT No.: PCT/GB02/04374

§ 371 (c)(1),
(2), (4) Date: Feb. 27, 2004

(87) PCT Pub. No.: WO03/031526

PCT Pub. Date: Apr. 17, 2003

(65) Prior Publication Data

US 2004/0260005 A1    Dec. 23, 2004

(30) Foreign Application Priority Data

Oct. 10, 2001    (GB)    ................................. 0124280

(51) Int. Cl.
*C08L 1/00*        (2006.01)
*C09D 151/00*    (2006.01)
*C09D 151/04*    (2006.01)

(52) U.S. Cl. .................. 523/201; 524/502; 525/70; 525/298; 525/902

(58) Field of Classification Search ................ 525/902, 525/298, 70; 523/201; 524/502
See application file for complete search history.

(56) References Cited

U.S. PATENT DOCUMENTS

| 4,654,397 A | 3/1987 | Mueller-Mall et al. |
| 6,011,106 A * | 1/2000 | de la Cuesta Sheppard 524/507 |
| 6,476,097 B1 * | 11/2002 | Zhao et al. ................. 523/205 |
| 6,485,786 B1 * | 11/2002 | Deng et al. .............. 427/385.5 |

FOREIGN PATENT DOCUMENTS

| EP | 0612805 A2 | 8/1994 |
| EP | 0612805 A3 | 8/1994 |
| EP | 0728779 A2 | 8/1996 |
| EP | 0728779 A3 | 8/1996 |
| EP | 1022311 A1 | 7/2000 |
| JP | 08231729 A | 9/1996 |

* cited by examiner

*Primary Examiner*—Kelechi C. Egwim
(74) *Attorney, Agent, or Firm*—Morgan Lewis & Bockius LLP

(57) ABSTRACT

Pigmented aqueous coating composition providing good blocking and elasticity properties comprises a blend of a seeded multistage polymer latex(es) having at least one soft and at least one hard polymer phases and a non-film-forming polymer latex(es), the seed polymer(s) having a $Tg \geq 10°$ C. lower than that of the hard polymer phase(s) and preferably having a $Tg \geq 10°$ C. higher than that of the soft polymer phase(s), and the multistage polymer(s) preferably having amino functionality incorporated by an imination reaction.

37 Claims, No Drawings

AQUEOUS COATING COMPOSITIONS

The present invention relates to a pigment-containing aqueous coating composition which provides a pigmented coating of high elasticity value and good blocking properties and comprises a certain blend of a seeded multistage polymer and a non-film-forming polymer.

Aqueous polymer compositions providing coatings having good blocking resistance (i.e. the resistance of coated surfaces against sticking together when stacked or placed in contact with each other under pressure) are known to the art. They can for example be achieved by employing "hard" (i.e. high Tg) polymer compositions. This however often requires excessive amounts of coalescing solvent to obtain film coatings at ambient temperature. Moreover such coatings are often unsatisfactory because the polymer film coating may possess little flexibility (i.e. elasticity) on substrates such as wood, which are not dimensionally stable.

A more sophisticated approach that is known is to employ morphologically designed polymer systems in aqueous compositions, for example a blend of hard (i.e. high Tg) and soft (i.e. low Tg) polymers or a multistage combination of hard and soft polymers, i.e. formed by a sequential polymerisation process. In such systems good blocking resistance and elasticity is achievable in clear coatings, but when used for the provision of pigmented coatings, the coating elasticity is compromised at the expense of good blocking properties. This is due to the presence of the pigment particles, e.g. titanium dioxide, necessary to achieve hiding power in the coating.

A further approach for achieving, inter alia, good blocking resistance is disclosed in EP-A-612805 wherein a non-film-forming hard particle polymer latex is combined with a multistage polymer latex of soft and hard polymer phases. Here too, however, severe loss of elasticity can arise when used for pigmented coatings—the presence of hard particles behaving as additional pigment particles as far as loss of flexibility is concerned within the desired range of pigment volume concentration (PVC) of the coating.

We have now discovered certain pigment-containing aqueous compositions which achieve good blocking resistance combined with good elasticity in pigmented coatings made from them. These comprise a blend of a latex of a sequential polymer system of hard and soft polymer phases prepared in the presence of a seed polymer of certain Tg properties and a non-film-forming hard polymer latex. While EP-A-612805 it is true does disclose in its description that it is preferred to use seeded polymerisation for the preparation of the multiphase polymer systems thereof, this is for the purpose of obtaining more uniform particle size compared to unseeded polymerisation rather than an improvement in product properties, and in fact there is no use of such a feature in any of the many worked examples of the publication, and in particular it is not used in the one worked example to a pigment-containing paint composition. Furthermore, the nature of the seed is not amplified and the particular properties essential in the present invention for achieving both good blocking and good elasticity is not disclosed or implied.

According to the present invention there is provided a pigment-containing aqueous coating composition which provides a pigmented coating having a pigment volume concentration (PVC) in the range of from 15 to 35% and an elasticity value of at least 30%;

wherein said aqueous coating composition comprises:
a seeded multistage polymer latex(es) (A), blended with a non-film forming polymer latex(es) (B), the amount of (A) in the blend corresponding to 75 to 98 weight % of the multistage polymer(s) of (A) based on total weight of the polymers of (A) and (B) and the amount of (B) in the blend corresponding to 2 to 25 weight % of the polymer(s) of (B) based on the total weight of the polymers of (A) and (B);

and wherein with regard to said seeded multistage polymer latex(es) (A):
(a) the multistage polymer(s) thereof comprises 50 to 90 wt % of at least one soft polymer phase having a Tg$\leq$25° C. and 10 to 50 wt % of at least one hard polymer phase having a Tg$\geq$30° C.;
(b) the multistage polymer latex(es) has been prepared in the presence of a seed polymer latex(es), the amount of said seed polymer latex(es) corresponding to 1 to 20 wt % of the seed polymer(s) of the latex(es) based on the weight of the multistage polymer(s); and
(c) the seed polymer(s) having a Tg which is at least 10° C. (preferably at least 20° C.) lower than the Tg of the hard polymer phase(s) of the multistage polymer(s).

There is further provided according to the invention a pigmented coating derived from an aqueous coating composition as defined above.

There is further provided according to the invention a method of coating a substrate which comprises applying an aqueous coating composition as defined above to a substrate and causing or allowing the aqueous carrier medium of the composition to be removed.

There is further provided according to the invention a coated substrate which has been prepared by applying an aqueous composition as defined above to a substrate and causing or allowing the aqueous carrier medium of the composition to be removed.

There is further provided a method for making a pigment-containing aqueous coating composition which comprises:
(1) forming a seeded multistage polymer latex(es) (A) by conducting a multistage polymer emulsion polymerisation(s) in the presence of a seed polymer latex(es), wherein:
(i) the multistage polymer(s) of (A) comprises 50 to 90 wt % of at least one soft polymer phase having a Tg of $\leq$25° C., and 10 to 50 wt % of at least one hard polymer phase having a Tg of $\geq$30° C.;
(ii) the seed polymer(s) of (A) has a Tg which is at least 10° C. (preferably at least 20° C.) lower than the Tg of the at least one hard polymer phase of the multistage polymer(s);
(iii) the multistage polymer latex(es) is formed in the presence of 1 to 20 wt % of the seed polymer(s) based on the weight of the multistage polymer(s);
(2) blending said seeded multistage polymer latex(es) (A) with a non-film-forming polymer latex(es) (B), the amount of (A) in the blend corresponding to 75 to 98% by weight of the multistage polymer(s) of (A) based on the total weight of the polymers of (A) and (B), and the amount of (B) in the blend corresponding to 2 to 25% by weight of polymer(s) of (B) based on the total weight of the polymers of (A) and (B);
(3) formulating said seeded multistage polymer latex(es) (A) and said non-film-forming polymer latex(es) (B) blended therewith with a particulate pigment in an amount to provide a pigment volume concentration (PVC) in a pigmented coating formed from the coating composition within the range of from 15 to 35%;

and wherein further a pigmented coating formed from the coating composition has an elasticity value of at least 30%.

(It is to be understood that the formulation of the multistage polymer(s), non-film-forming polymer(s) and pigment could be conducted in a single stage if desired).

It is preferred that the Tg of the seed polymer(s) is at least 10° C. (preferably at least 20° C.) higher than the Tg of the soft polymer phase(s) of the multistage polymer(s).

In a particularly preferred embodiment of the invention, the multistage polymer(s) bears amino functional groups which are useful eg for providing enhanced substrate-adhesion of a resulting coating. These are preferably incorporated by making a carboxyl-functional precursor multistage polymer(s) (ie the soft and/or hard polymer phases bearing carboxyl groups introduced by employing ethylenically unsaturated acid functional monomer(s) such as acrylic acid or methacrylic acid in their preparation) and subsequently converting at least a proportion of these carboxyl groups to amino groups (as part of amino ester groups) by reaction with an alkylene imine such as ethylene imine or propylene imine. Such a reaction is well established in the art, being known as an imination reaction.

By a polymer latex is meant herein an emulsion of the polymer thereof in a liquid carrier medium of which water is the principal component (at least 50% by weight, most usually at least 90% by weight of the carrier medium). The dispersed particles of polymer emulsion (i.e. latex) are normally of colloidal size.

The Tg of a polymer herein stands for the glass transition temperature and is well known to be the temperature at which a polymer changes from a glassy, brittle state to a rubbery state. Tg values of polymers may be determined experimentally using techniques such as differential scanning calorimetry DSC or calculated using the well-known Fox equation.

A polymer having a Tg of ≦25° C. is termed herein a "soft" polymer for convenience, while a polymer having a Tg of ≧30° C. is termed herein a "hard" polymer for convenience.

By a multistage polymer herein is meant a polymer system that has been formed by a multistage emulsion polymerisation process in which two or more polymer latexes are prepared by the sequential aqueous emulsion polymerisation of two or more distinct monomer mixtures. Thus in its simplest (and preferred) form a first polymer latex is first formed (by emulsion polymerisation), which could e.g. be either soft or hard as defined in the invention, and then a second polymer latex is formed by emulsion polymerisation in the presence of the first polymer latex; the second polymer could be soft if the first polymer is hard, or could be hard if the first polymer is soft. More complex multistage polymer designs include ones with 2 or more soft polymer latexes and/or 2 or more hard polymer latexes, the polymerisations being carried out in any order.

In the formation of a seeded multistage polymer, the emulsion polymerisation to form the first formed polymer phase is conducted in the presence of a seed polymer latex(es), the latter preferably also being made using an emulsion polymerisation process. It is also possible (but less preferred) to add further seed polymer latex when commencing the second or subsequent polymerisation(s) of the multistage polymerisation process. The seed polymer latex may be pre-formed, i.e. formed separately and added to the vessel to be used for the sequential polymerisation process, or may be formed in-situ prior to the preparation of the multistage polymer, i.e. made in the same vessel to be used for the sequential polymerisation process.

It is to be understood that more than one seeded multistage polymer latex may be present in the blend (as (A)) with the non-film-forming polymer latex(es) (eg 2 or more) but in some cases for ease of description the use of one only is described.

The non-film-forming polymer latex(es) of the invention is usually also made by an emulsion polymerisation process. By a "non-film-forming polymer latex" is meant herein that the latex will not form a film at ambient temperature or below, or in other words will only form a film at temperatures above ambient. For the purposes of this specification, ambient temperature is taken as being in the range of 15° C. to 30° C. The non-film-forming polymer latex(es) is normally a single polymer latex but could also be a multistage polymer latex, including eg an oligomer-supported multistage polymer latex (ie a higher molecular weight polymer being formed in the presence of an oligomer or vice versa).

Again, it is to be understood that two or more non-film-forming polymer latexes could be present in the blend (as (B)), but for convenience in some cases the use of one only is described. The same applies to the seed polymer latex (can be 2 or more but in some cases only one is described for convenience).

(For the sake of clarity, herein the letters s or es at the end of a term (as appropriate) means that the term includes the plural as well as the singular; eg polymer(s) means polymer or polymers and latex(es) means latex or latexes.)

In the blend of the seeded multistage polymer latex(es) (A) and the non-film-forming polymer latex(es) (B), the amount of (A) in the blend corresponds to 75 to 98% by weight of solid polymer material of (A) (including the polymer(s) from the seed) based on the weight of the total polymer solids of (A) and (B) (including the seed polymer(s) in (A)), more preferably 80 to 98% by weight and particularly 90 to 98% by weight. Correspondingly, the amount of (B) in the blend corresponds to 2 to 25% by weight of solid polymer(s) of (B) based on the total weight of the polymers of (A) and (B) (including the seed polymer(s) in (A)), more preferably 2 to 20 weight % and particularly 2 to 10 weight %.

The polymer solids content of the seeded multistage latex(es) (A) is preferably in the range of from 20 to 65 wt %, more preferably 35 to 50 wt %.

The multistage polymer latex(es) (A) (or a precursor(s) thereof if imination is subsequently to be carried out—see above) is formed in the presence of a seed polymer latex(es), the amount of seed latex(es) corresponding to 1 to 20 wt % of the seed polymer(s) (solid) of the seed latex(es) based on the weight of the multistage polymer(s) (solid), more preferably 1 to 15 wt %, still more preferably 1 to 10 wt % and particularly 1 to 6 wt %. The polymer solids content of the seed polymer latex(es) is preferably in the range of from 10 to 40 wt %, more preferably 20 to 30 wt %. (NB reference to multistage polymer weight refers to the final polymer system, ie after imination if this is being employed).

The multistage polymer(s) of (A) comprises 50 to 90 wt % of at least one soft polymer phase having Tg≦25° C., more preferably 60 to 90 wt % and particularly 70 to 90 wt %, and 10 to 50 wt % of at least one hard polymer phase having Tg≧30° C., more preferably 10 to 40 wt %, and particularly 10 to 30 weight %. The soft polymer(s) may be formed first in the sequential polymerisation process, or the hard polymer(s) may be formed first. Where more than one soft polymer and/or more than one hard polymer is used, any practicable order of polymerisation may be used for forming the polymer phases.

The Tg of the (or each) soft polymer phase of the multistage polymer(s) is ≦25° C., more preferably ≦20° C. and particularly ≦10° C. Preferred ranges for the Tg of the soft polymer are −60 to 25° C., more preferred −50 to 20° C. and particularly −25 to 10° C. The Tg of the (or each) hard polymer phase of the multistage polymer(s) is ≧30° C., more preferably ≧40° C. and particularly ≧60° C. Preferred ranges for the Tg of the hard polymer are 30 to 140° C., more preferred 40 to 110° C. and particularly 70 to 110° C.

The Tg of the seed polymer(s) of the seed polymer latex(es) must be at least 10° C. lower than the (or each) Tg of the hard polymer phase(s) of the multistage polymer(s), preferably at least 20° C. lower. Preferably, the Tg of the seed polymer(s) is at least 10° C. higher than the Tg of the soft polymer phase(s) of the multistage polymer(s), preferably at least 20° C. higher. Subject to conforming with the preceding constraints, a typical range for the Tg of the seed polymer is preferably 20 to 120° C., more preferred 20 to 80° C. and particularly 20 to 60° C.

The (or each) Tg of the non-film-forming polymer(s) is typically within the range of from 40 to 140° C., preferably 60 to 120° C. and particularly 80 to 120° C.

The average particle diameter of the (or each) seed polymer is preferably ≦80 nm, more preferably ≦60 nm and particularly ≦50 nm. A typical range would be 30 to 60 nm. (Average particle diameter or size herein is that as determined by light scattering using a Malvern Zeta sizer 3000 HSa ). The average particle diameter of the (or each) seeded multistage polymer is preferably ≦250 nm, more preferably ≦200 nm, and particularly ≦150 nm. A typical range would be 90 to 140 nm.

The average particle diameter of the (or each) non-film-forming polymer is preferably ≦100 nm, more preferably ≦75 nm and particularly ≦60 nm. A typical range would be 30 to 70 nm.

The PVC of a pigmented coating derived from the invention aqueous composition should be in the range of from 15% to 35%, more preferably 15 to 30%, and particularly 15 to 25%. The PVC (pigment volume concentration) is defined as the percentage by volume that the pigment occupies in dry film made from the aqueous composition.

The elasticity of a pigmented coating derived from the invention composition should be at least 30%, preferably at least 50% and particularly at least 60%. A preferred range is from 30 to 130%, more preferred 50 to 120% and particularly 60 to 100%. Elasticity as meant herein is defined by a test method which is described later.

The weight average molecular weight Mw of the (or each) seed polymer will often be within the range of from 100,000 to $6\times10^6$ Daltons. Mw for the (or each) hard and soft polymer of the multistage polymer(s) will often be within the range of from 10,000 to $6\times10^6$ Daltons. (Polymer molecular weights may be determined by gel permeation chromatography calibrated using an appropriate known polymer as standard).

It may be mentioned that polymer(s) of lower molecular weight, viz oligomer(s), usually having Mw of not more than 80,000 Daltons (eg Mw in the range of from 5,000 to 80,000 Daltons) may be used in conjunction with higher molecular weight polymers (eg Mw at least 100,000 to $6\times10^6$ Daltons) in the provision of the multistage polymer(s). For example the soft polymer may be an oligomer and the hard polymer may be a higher molecular polymer, or vice versa. Alternatively, or in addition, where 2 or more soft polymers are used, oligomer/higher molecular weight polymer combinations can be used for this. The same option applies when using 2 or more hard polymer phases (ie they can comprise oligomer/higher polymer combinations). Also, as mentioned above, the non-film-forming polymer latex(es) can itself be a multistage polymer latex(es), the latter term being intended to include an oligomer/higher molecular weight polymer combination (ie an oligomer-supported polymer latex).

All the polymers employed in the invention, apart from possibly the non-film-forming polymer, are vinyl polymers. (However, even the non-film-forming polymer is much preferred to be a vinyl polymer, and for convenience it will be discussed herein only in terms of a vinyl polymer. Nevertheless the non-film-forming polymer could conceivably be another type of polymer, such as a polyurethane or a urethane-acrylic hybrid polymer, the urethane in the latter optionally being an oligomer). By a vinyl polymer herein is meant a homo or copolymer derived from the addition polymerisation (using a free radical process) of at least one olefinically unsaturated monomer. (By a vinyl monomer is therefore meant herein an olefinically unsaturated monomer).

It is sometimes useful for at least one of the soft and hard polymers of the multistage polymer and of the seed polymer to be crosslinked.

Examples of vinyl monomers which may be used to form the hard and soft polymers of the multistage polymer(s), the seed polymer(s) and the non-film-forming polymer(s) include 1,3-butadiene, isoprene, styrene, α-methyl styrene, divinyl benzene, acrylonitronitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

$$CH_2=CR^1COOR^2$$

wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, isobutyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethylmethacrylate, 2-hydroxypropyl methacrylate, 2-hydroxypropyl acrylate, and their modified analogues like Tone M-100. (Tone is a trademark of Union Carbide Corporation). Olefinically unsaturated monocarboxylic and/or dicarboxylic acids, such as acrylic acid, methacrylic acid, beta carboxy ethylacrylate, fumaric acid, and itaconic acid, are other examples which can be used (and as discussed above, a proportion of the polymer-bound carboxyl groups from such carboxylic acid functional monomers may be subsequently iminated to form aminoester groups, thereby providing chain pendant amine groups).

Particularly preferred are vinyl polymers made from a monomer system comprising at least 40 weight % of one or more monomers of the formula $CH_2=CR^1COOR^2$ defined above. Such preferred polymers are defined herein as acrylic polymers. More preferably, the monomer system contains at least 50 weight % of such monomers, and particularly at least 60 weight %. The other monomers in such acrylic polymers (if used) may include one or more of the other vinyl monomers mentioned above, and/or may include ones different to such other monomers. Styrene is a useful other monomer. Preferred (meth)acrylic ester monomers include methyl methacrylate, n-butyl acrylate, n-butyl methacrylate, isobutyl methacrylate and 2-ethylhexyl acrylate.

Also useful are vinyl polymers made from a monomer system comprising at least 50 wt % (preferably at least 60 wt %) of styrene and one or more monomers of the formula $CH^2=CR^1COOR^2$ defined above as well as one or more of the other monomers mentioned above and/or may include one(s) different to such other monomers. Such vinyl polymers are commonly called styrene-acrylic polymers.

The vinyl polymers may often advantageously contain comonomers which provide an adhesion and/or crosslinking functionality to the resulting polymer coating. Examples of these, some of which have already been mentioned above, include acrylic and methacrylic monomers having at least one free carboxyl, hydroxyl, epoxy, aceto acetoxy, or amino group, such as acrylic acid and methacrylic acid (and also their amides, hydroxyalkyl esters and amino alkyl esters), glycidyl acrylate, glycidyl methacrylate, aceto acetoxy ethyl methacrylate, t-butylamino ethyl methacrylate and dimethylamino ethyl methacrylate; other adhesion promoting monomers include heterocyclic vinyl compounds such as vinyl pyrrolidone and vinyl imidazole. The vinyl polymer could also include monomers which impart in-situ crosslinking (or "precrosslinking") in the polymer, ie crosslinking in the polymer as it is being formed (rather than subsequently after a coating has been formed as do the crosslinking monomers mentioned above); examples of such monomers include allyl methacrylate, tetraethylene glycol methacrylate, and divinyl benzene.

Such monomers (described in the preceeding paragraph) when used are normally used in an amount of from 0.1 to 10 weight %, more usually from 0.1 to 5 weight % of the total weight of monomers used for polymerisation.

As discussed above, in one preferred embodiment of the invention, amino functionality can be incorporated into a multistagepolymer by preparing a vinyl polymer(s) of the multistage polymer comprising units of an unsaturated acid, such as acrylic acid or methacrylic acid and subsequently converting at least a proportion of the carboxylic acid groups to amino groups (as part of amino ester groups) by an imination reaction using an alkylene imine such as ethylene imine or propylene imine.

It will be appreciated that although the vinyl polymers of the multistage, seed and non-film-forming polymers can be made from one or more of the above-discussed vinyl monomers, it will be necessary to select both the amounts and types of such monomers as will provide the desired Tg characteristics of any particular vinyl polymer.

The hard polymer(s) of a multistage polymer of the invention may e.g. be derived from a monomer composition comprising 40 to 100 wt % (more preferably 50 to 78 wt %) of at least one monomer selected from methyl methacrylate, styrene, ethyl methacrylate and isobutyl methacrylate; 0 to 60 wt % (more preferably 20 to 48 wt %), of at least one monomer selected from n-butyl acrylate, n-butyl methacrylate, ethyl acrylate and 2-ethylhexyl acrylate; and 0 to 10 wt % (preferably 2 to 6 wt %) of at least one monomer selected from acrylic acid, methacrylic acid, and beta carboxyethyl acrylate (preferably at least a proportion of the polymer-bound carboxylic acid groups being iminated to form amino groups).

The soft polymer(s) of a multistage polymer of the invention may e.g. be derived from a monomer composition comprising 40 to 100 wt % (preferably 50 to 78 wt %) of at least one monomer selected from n-butyl acrylate, n-butyl methacrylate, ethyl acrylate, and 2-ethylhexyl acrylate; 0 to 60 wt % (preferably 20 to 48 wt %) of at least one monomer selected from methyl methacrylate, styrene, ethyl methacrylate and isobutyl methacrylate; and 0 to 10 wt % (preferably 2 to 6 wt %) of at least one monomer selected from acrylic acid, methacrylic acid and beta carboxyethyl acrylate (preferably at least a proportion of the polymer-bound carboxylic acid groups being iminated to form amino groups).

The non-film-forming polymer(s) of the invention may e.g. be derived from a monomer composition comprising 50 to 100 wt % (preferably 80 to 94 wt %) of at least one monomer selected from methyl methacrylate, styrene, ethyl methacrylate and isobutyl methacrylate; 0 to 50 wt % (preferably 5 to 19 wt %) of at least one monomer selected from n-butyl acrylate, n-butyl methacrylate, ethyl acrylate and 2-ethylhexyl acrylate; and 0 to 10 wt % (preferably 1 to 6 wt %) of at least one monomer selected from acrylic acid, and methacrylic acid.

In many cases the non-film-forming polymer(s) for the invention may be provided by a commercially available polymer latex, or at any rate a polymer latex readily to hand and not especially prepared for the invention composition.

The amounts and types of monomers possible to make the seed polymer(s) will of course depend on the particular multistage polymer in the composition in view of the Tg requirements for the seed polymer(s) of the invention composition. Typically the (co)monomers employed will be selected from methyl methacrylate, n-butyl methacrylate, isobutyl methacrylate, t-butyl methacrylate, ethyl methacrylate, styrene, n-butyl acrylate, 2-ethylhexyl methacrylate acrylic acid and methacrylic acid.

All the vinyl polymers used in the invention composition are normally made using free radical addition polymerisation in an aqueous emulsion polymerisation process to form an aqueous polymer emulsion (alternatively termed an aqueous polymer latex). Such an aqueous emulsion polymerisation process is, in itself, extremely well known in the art and need not be described in great detail. Suffice to say that such a process involves dispersing the monomers in an aqueous medium and conducting polymerisation using a free-radical yielding initiator and (usually) appropriate heating (e.g. 30 to 120° C.) and agitation (stirring) being employed. The aqueous emulsion polymerisation can be effected using one or more conventional emulsifying agents, these being surfactants. Anionic and non-ionic surfactants can be used, and also combinations of the two types; cationic surfactants can also be used. Chain transfer agents (e.g. mercaptanes or suitable cobalt chelate complexes) may be included if desired to control molecular weight.

Because of the seeded polymerisation process to make a multistage polymer latex of the invention, it is possible to employ quite low levels of surfactant when making such a latex. This arises because the particle size and amount of seed used in the polymerisation largely controls the final particle size, rather than the surfactant as in a conventional emulsion polymerisation. The lower amount of surfactant leads to excellent early water resistance and excellent alkali resistance in a coating made from the invention composition. (By "early" is meant that the resistance is effective very shortly after the coating has been applied).

The amount of surfactant used in the emulsion polymerisation to make a multistage polymer is preferably $\leq 4$ wt % based on the total weight of monomers used for the soft and hard phase polymers of the multistage polymer, more preferably ≦2 wt % and particularly ≦1.5 wt %. The amount of surfactant used in the emulsion polymerisation to make a seed polymer is preferably ≦5 wt % based on the total weight of the monomers used for the seed polymer, more preferably ≦4 wt % and particularly ≦3 wt %.

An emulsion polymerisation for making a vinyl polymer may be carried out using an "all-in-one" batch process (i.e. a process in which all the materials to be employed are present in the polymerisation medium at the start of polymerisation) or a semi-batch process in which one or more of the materials employed (usually at least one of the monomers) is wholly or partially fed to the polymerisation medium during the polymerisation. In-line mixing for two or more of the materials employed may also be used.

As mentioned previously, the coating compositions of the invention provide pigmented coatings having good blocking properties with good elasticity. In particular good "early blocking" is achieved. By early blocking is meant a blocking test done on fresh films at higher film thicknesses as opposed to normal blocking which is done on aged films at lower film thickness. (Early blocking: 250–500 μm wet film thickness dried overnight (16 hours) at ambient temperature. Normal blocking: 120 μm wet film thickness, first dried at ambient temperature for 4 hours and then aged in an oven at 50° C. for 16 hours). Thus, early blocking is a more stringent test, as not all evaporable material (e.g. coalescent agent) is likely to be removed. A more comprehensive description of the early blocking test method as used herein is described later.

Pigments which may be used in the present invention include, for example, titanium dioxide, iron oxide, chromium-based compounds and metal phthalocyanine compounds. They are finely divided inorganic or organic powders (usually of particle size in the region of 0.1 to 10 μm, and obtained e.g. by grinding or milling) for achieving properties such as colour, opacity, and hiding power. They are usually incorporated into a coating composition in the form of a dry powder or a uniform dispersion of the pigment in a suitable carrier medium. Titanium dioxide (a white pigment) is the most preferred pigment in the present invention.

The pigment-containing composition of this invention may contain various other ingredients such as extenders (eg calcium carbonate and china clay), dispersants such as pigment dispersion aids, surfactants, wetting agents, thickeners, rheology modifiers, levelling agents, anti-cratering agents, biocides, antifoam agents, sedimentation inhibitors, UV absorbers, heat stabilisers, and antioxidants.

It is possible to incorporate coalescing agents (normally organic solvents or plasticisers) into the composition to optimise or fine tune the film forming properties, usually in an amount of 0 to 20 wt %, more particularly 0 to 10 wt %, based on the weight of solid polymeric material in the composition. It is, however, in many cases preferable not to include a coalescent agent in the composition.

In particular the composition of invention may be in the form of (i.e. formulated as) a paint for architectural or industrial uses.

The invention coating compositions may be applied to a wide variety of substrates such as e.g. wood, paper, plastics, fibre, metal, glass, ceramics, plaster, asphalt, board, leather and concrete. Application may be any conventional method including brushing, dipping, flow coating, spraying, roller coating, and pad coating.

The composition once applied may be allowed to dry naturally at ambient temperature, or the drying process may (if feasible) be accelerated by heat.

The present invention is now further illustrated but in no way limited by reference to the following examples. Unless otherwise specified all parts, percentages, and ratios are on a weight basis. The prefix C before an example number denotes that it is comparative.

The glass transition temperatures of the polymers in the examples were calculated by means of the Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to ° C.

In the examples the following abbreviations or trade names are employed.

| | |
|---|---|
| n-BA = | n-butyl acrylate |
| n-BMA = | n-butyl methacrylate |
| MMA = | methyl methacrylate |
| AA = | acrylic acid |
| MAA = | methacrylic acid |
| EB = | early blocking value |
| EI = | elasticity value, expressed as a % |
| PVC = | pigment volume concentration |
| "Texanol" = | coalescent agent (ex Eastman Chemical) |
| "Drewplus" SG 4552 = | defoamer (ex Ashland) |
| AMP-95 = | neutralising agent (ex Angus Chemie) |
| "Dehydran" 1293 = | defoamer (ex Cognis) |
| "Surfynol" 104E = | wetting agent (ex Air Products) |
| "NeoCryl" BT24 = | grinding medium (ex Avecia BV) |
| "Tioxide" TR92 = | titanium dioxide pigment (ex Huntsman Tioxide) |
| "Viscoatex" 730 = | rheology modifier (ex Coatex) |
| "Borchigel" L75N = | rheology modifier (ex Borchers) |

Test Methods and General Procedures

Method for the Synthesis of Polymer Latices

All polymerizations were conducted in a 2 liter reaction vessel equipped with a stirrer, reflux condenser, thermometer and nitrogen purge. A temperature controlled heating mantle was used to heat the reaction vessel. The ingredients for the polymerizations were added as indicated in the specific examples as below. At the end of the polymerizations all dispersions were pH adjusted to a pH of 7.5–8.0 using 12.5% aqueous ammonia solution.

Early Blocking Test

Test composition (e.g. paint) is applied at 350 μm wet film thickness on test chart. Films are dried for 16 hours at ambient temperature. Blocking is tested for by placing two strips of coated film together on the coated side. A 1 Kg weight is placed on this film assembly in an area of 1 sq cm, and placed in an oven at 50° C. for 4 hours. Blocking is assessed after this time, by the ease of pulling the films apart: 0=poor; 5=excellent.

Determination of Elasticity

A 400 μm wet film of the test composition (e.g. paint) is applied on glass panel containing release paper. This film is allowed to dry for 4 hours at ambient temperature and then 16 hours at 50° C. The paint film is released from the release paper and cut into dumb bell shaped samples. Elasticity of a sample is measured using an Instron instrument at a draw-bench speed of 100 mm/min.

The result is expressed as a percentage, i.e. if original length=x; extended length=y; and extension=(y−x); then Elasticity=(y−x)/x×100%.

Preparation of a Seed Polymer Latex L1

| | grams |
|---|---|
| Initial charge | |
| Demin water = | 1500 |
| Surfactant - Ammonium dodecyl benzene sulphonate = | 12.1 |
| Initiator - Ammonium persulphate = | 2.42 |
| Buffer - Sodium bicarbonate = | 1.03 |
| Monomer feed | |
| n-BMA/AA mixture (96/4) = | 485 |
| (calculated Tg of seed polymer = 23° C.) | |

The initial charge mixture was transferred to the reaction vessel and stirred under nitrogen purge.

The monomer feed above was prepared and transferred to feed vessel.

The heating mantle was turned on and the temperature was taken up to 85° C. At this temperature the monomer feed was started and fed over 120 minutes. During this time the reaction temperature was maintained at 88–90° C. On completion of the monomer feed, the reaction temperature was kept at 88–90° C. for a further 30 minutes. The resulting polymer latex was cooled to room temperature and filtered using a 200 mesh filter cloth.

The solids content of the latex was approximately 25% and had average particle size of 45 nm.

Preparation of a Non-seeded Iminated Multistage Polymer Latex L2

The multistage polymer latex L2 was non-seeded. The multipolymer had an approximately 75/25 soft polymer/hard polymer ratio. The Tg of the soft polymer (prior to imination) was −5° C. and the Tg of the hard polymer (prior to imination) was 85° C.

| | grams |
|---|---|
| Initial charge | |
| Demin water = | 620 |
| Surfactant - ammonium dodecyl benzene sulphonate = | 0.5 |
| Initiator - Ammonium persulphate = | 0.5 |
| Monomer Feed I | |
| AA/MAA/n-BA/n-BMA mixture (1.5/1.5/36/61) = | 653 |
| (calculated Tg of Feed I polymer = −5° C.) | |
| Monomer Feed II | |
| MAA/n-BMA/MMA mixture (3.0/22/75) = | 218 |
| (calculated Tg of Feed II polymer = 85° C.) | |
| Surfactant and initiator feeds | |
| Demin water = | 500 |
| Surfactant - ammonium dodecyl benzene sulphonate = | 8.21 |
| Initiator - ammonium persulphate = | 0.24 |

The ammonium dodecyl benzene sulphonate surfactant and ammonium persulphate initiator feeds are added concurrently with the monomer feeds.

The initial charge mixture was transferred to the reaction vessel and stirred under nitrogen purge.

Monomer feeds I and II were prepared and transferred to their respective feed vessels. The surfactant and initiator feeds were prepared and transferred to their respective feed vessels.

The heating mantle was turned on and the temperature was taken up to 85° C. At this temperature the monomer feed I was started and fed over 120 minutes. During this time the reaction temperature was maintained at 88–90° C.

On completion of monomer feed I the reaction temperature was kept at 88–90° C. for a further 30 minutes.

Monomer feed II was then fed over a period of 35 minutes and temperature was maintained at 88–90° C.

Following the completion of the polymerisation reaction the batch was cooled to 60° C. and maintained at this temperature while 13 g of propylene imine was slowly added to the latex. The latex temperature was held at 60° C. for a further 3 hours before the resulting latex was cooled to room temperature and filtered using a 200 mesh filter cloth. (The formation of a proportion of aminoester groups from carboxyl groups only had a minimal effect on the Tg's of the soft and hard polymers.)

The solid content of the latex was approximately 44% and had average particle size of 110 nm.

Preparation of a Seeded Iminated Multistage Polymer Latex L3

The multistage polymer latex L3 contains 5 wt % of preformed seed by employing the seed polymer latex L1 in the polymerisation. The multistage polymer composition was as per the multistage polymer of L2 (same soft/hard polymer ratio and same Tg's for the soft and hard polymers).

The recipe and procedure of this seeded sequential polymer latex was similar to L2 as above, except the initial charge was substituted as below which contained the pre formed seed latex L1 and the feed surfactant was reduced to maintain a constant overall surfactant charge

| | grams |
|---|---|
| Initial charge | |
| Demin water = | 490 |
| Seed latex - L1 = | 170 |
| Surfactant - ammonium dodecyl benzene sulphonate = | 3.48 |
| Initiator - Ammonium persulphate = | 0.5 |
| Feed surfactant | |
| Surfactant - ammonium dodecyl benzene sulphonate = | 5.23 |

Following the completion of the polymerization reaction the batch was cooled and iminated as per the non-seeded multistage polymer of L2 (imination only having a minimal effect on the Tg's of the soft and hard polymers).

The solids content of the latex was approximately 44% and had average particle size of 110 nm.

Preparation of a Physical Latex Blend L4 from the Seed Polymer Latex (L1) and the Non-seeded Multistage Polymer Latex (L2)

The non-seeded multistage polymer latex L2 was physically blended with 5 wt % of preformed seed (using the seed latex L1) (the seed latex of L1 being post added to the non-seeded multistage latex L2).

"NeoCryl" XK25

This is a commercially available acrylic polymer latex (ex Avecia BV) which is non-film-forming (according to the invention), having Tg=110° C. and average particle size=50 nm. This is used (see later) for post blending with the latices L2, L3 and L4.

Pigmented Formulations of a Sprayable Paint Composition

The following gives the general formulation for paint compositions made from various latex polymer binders comprised of L2, L3 or L4 blended with "NeoCryl" XK25 at various PVC concentrations (the formulation below is for a PVC of 20%, but the amount of Tioxide TR92 is also varied to give PVC's of 25% and 30%).

PVC=20%: Solids=53% w/w; pH=8.4–8.6

| 1. Latex Binder = | 61.0 |
| 2. Texanol = | 1.60 |
| 3. Drewplus SG 4552 = | 1.0 |
| 4. Demin water = | 5.90 |
| 5. AMP-95 = | 0.20 |
| 6. Dehydran 1293 = | 0.50 |
| 7. Surfynol 104E = | 0.50 |
| 8. NeoCryl BT24 = | 3.10 |
| 9. Tioxide TR 92 = | 24.72 |
| 10. Viscoatex 730 = | 1.20 |
| 11. Borchigel L75 N = | 0.30 |

Disperse items 4–9 under a Cowless dissolver (an impeller design used in the paints industry for efficient dispersal of materials) and stir until desired fineness (<10 μm) to make the pigment paste. Adjust the pH of item 1 to pH 8.8 with aqueous ammonia (25% solution). Add item 2 to item 1. Add the pigment paste to the mixture of 2 plus 1, followed by item 3. Add items 10 and 11 in listed order whilst stirring and stir until crater free paint film on glass is obtained.

Note that, as mentioned above, the amount of Tioxide TR92 is altered to achieve the required PVC levels.

Examples C1, 2 and C3

In all these examples paint compositions were made at a PVC of 20%.

In Example C1, the latex binder of the paint composition consisted of the unseeded multistage polymer latex L2 blended with the non-film-forming polymer latex "NeoCryl" XK25. In Example 2, the latex binder of the paint composition consisted of the seeded multistage polymer latex L3 blended with "NeoCryl" XK25. In Example C3, the latex binder of the paint composition consisted of the polymer latex L4 (physical blend of L2 with the seed latex L1) blended with "NeoCryl" XK25. Various levels of the non-film-forming polymer latex were employed, viz 0 wt %, 6 wt %, 10 wt % and 20 wt % (the amounts correspond to the weight of solid non-film-forming polymer in the composition based on the total weight of polymers in the multistage polymer). The early blocking values (EB) and elasticity values (EI, expressed as a %) of paint films were determined for each composition. The values are shown in Table 1.

TABLE 1

Early Blocking (EB) and Elasticity values (EI) of pigmented coatings containing different levels of non film forming polymer latex at a PVC of 20%

| | Amount of polymer of blended non film forming latex (%) | | | |
|---|---|---|---|---|
| Example No. | 0% EB/EI | 6% EB/EI | 10% EB/EI | 20% EB/EI |
| C1 | 2/109 | 3/100 | 3/80 | 3/45 |
| 2 | 3/105 | 3/104 | 4/102 | 4/75 |
| C3 | 2/84 | 3/70 | 3/50 | 4/11 |

The results show that only in the composition according to the invention (Example 2) was a good combination of EB and EI maintained with increasing amount of non-film-forming polymer latex.

Examples C4, 5 and C6

In these examples paint compositions were made at different PVC's, viz at 20%, 25% and 30%, but keeping the amount of the non-film-forming polymer of "NeoCryl" XK25 in the latex binder constant at 10 wt %.

In Example C4, the latex binder of the paint composition consisted of the unseeded multistage polymer latex L2 blended with the non-film-forming polymer latex (10 wt %). In Example 5, the latex binder of the paint composition consisted of the seeded multistage polymer latex L3 blended with the non-film-forming polymer latex (10 wt %). In Example C6, the latex binder of the paint composition consisted of the polymer latex L4 (physical blend of L2 with the seed latex L1) blended with the non-film-forming polymer latex (10 wt %). The EB and EI values (EI expressed as a %) of paint films were determined for each composition, the results being shown in Table 2.

TABLE 2

Early Blocking (EB) and Elasticity values of pigmented coatings containing 10 wt % of non film forming polymer at different PVC's

| | PVC (%) | | |
|---|---|---|---|
| Example Nos. | 20% EB/EI | 25% EB/EI | 30% EB/EI |
| C4 | 3/80 | 3/60 | 4/25 |
| 5 | 4/102 | 4/70 | 4/45 |
| C6 | 3/50 | 4/20 | 4/10 |

Example 5 using the invention composition exhibited a superior combination of EB and EI with increasing PVC.

The invention claimed is:

1. Pigment-containing aqueous coating composition which provides a pigmented coating having a pigment volume concentration (PVC) in the range of from 15 to 35% and an elasticity value of at least 30%;
wherein said aqueous coating composition comprises:
a seeded multistage polymer latex(es) (A) blended with a non-film forming polymer latex(es) (B), the amount of (A) in the blend corresponding to 75 to 98 weight % of the multistage polymer(s) of (A) based on total weight of the polymers of (A) and (B), and the amount of (B)

in the blend corresponding to 2 to 25 weight % of the polymer(s) of (B) based on the total weight of the polymers of (A) and (B);

and wherein with regard to the seeded multistage polymer latex(es) (A):
  (a) the multistage polymer(s) thereof comprises 50 to 90 wt % of at least one soft polymer phase having a Tg $\leq 25°$ C. and 10 to 50 wt % of at least one hard polymer phase having a Tg $\geq 30°$ C.;
  (b) the multistage polymer latex(es) has been prepared in the presence of a seed polymer latex(es), the amount of said seed polymer latex(es) corresponding to 1 to 20 wt % of the seed polymer(s) of the latex(es) based on the weight of the multistage polymer(s); and
  (c) the seed polymer(s) having a Tg which is at least 10° C. lower than the Tg of said hard polymer phase(s) of the multistage polymer(s).

2. Composition according to claim 1 wherein the seed polymer has a Tg which is at least 10° C. higher than the Tg of said at least one soft polymer phase of the multistage polymer(s).

3. Composition according to claim 1 wherein the multistage polymer(s) bears amino functional groups incorporated by an imination reaction.

4. Composition according to claim 1 wherein the PVC is within the range of from 15 to 30%.

5. Composition according to claim 1 wherein the elasticity value is within the range of from 30 to 130%.

6. Composition according to claim 1 wherein in the blend of the seeded multistage polymer latex(es) (A) and the non-film-forming polymer latex(es) (B) the amount of (A) in the blend corresponds to 80 to 98% by weight of solid polymer material of (A) based on the total weight of the polymers of (A) and (B), and the amount of (B) in the blend corresponds to 2 to 20% by weight of solid polymer material of (B) based on the total weight of the polymers of (A) and (B).

7. Composition according to claim 1 wherein at least one of said at least one soft polymer and/or at least one hard polymer of the multistage polymer(s) is crosslinked.

8. Composition according to claim 1 wherein seeded multistage polymer(s) comprises 2 or more soft polymers.

9. Composition according to claim 1 wherein seeded multistage polymer(s) comprises 2 or more hard polymers.

10. Composition according to claim 1 having 2 or more multistage polymer latexes.

11. Composition according to claim 1 having 2 or more non-film-forming latexes.

12. Composition according to claim 1 wherein said composition includes a combination(s) of oligomer(s) and higher molecular weight polymer(s).

13. Composition according to claim 12 wherein said combination(s) provides one or more of a seed polymer(s), a soft polymer(s) of multistage polymer(s), a hard polymer of multistage polymer(s), and a non-film-forming polymer(s).

14. Composition according to claim 1 wherein said composition is free of coalescent agent.

15. Composition according to claim 1 wherein the polymer solids content of the seeded multistage polymer latex (es) of (A) is in the range of from 30 to 65 wt %.

16. Composition according to claim 1 wherein the amount of seed latex(es) corresponds to 1 to 15 wt % of the seed polymer(s) (solid) of the seed latex(es) based on the weight of the multistage polymer(s) (solid).

17. Composition according to claim 1 wherein the seed polymer latex(es) is preformed.

18. Composition according to claim 1 wherein the seed polymer latex(es) is formed in-situ.

19. Composition according to claim 1 wherein the seed polymer(s) is crosslinked.

20. Composition according to claim 1 wherein the multistage polymer(s) of (A) comprises 60 to 90 wt % of said at least one soft polymer phase and 10 to 40 wt % of said at least one hard polymer phase.

21. Composition according to claim 1, wherein said at least one soft polymer of the multistage polymer(s) has Tg$\leq 20°$ C.

22. Composition according to claim 1 wherein said at least one hard polymer of the multistage polymer(s) has a Tg$\geq 40°$ C.

23. Composition according to claim 1 wherein the Tg of the non-film-forming polymer(s) is within the range of from 40 to 140° C.

24. Composition according to claim 1 wherein the average particle size of the seed polymer(s) is $\leq 80$ nm.

25. Composition according to claim 1 wherein the average particle size of the seeded multistage polymer(s) is $\leq 250$ nm.

26. Composition according to claim 1 wherein said at least one hard polymer of the multistage polymer(s) is derived from a monomer composition(s) comprising 50 to 78 wt % of at least one monomer selected from methyl methacrylate, styrene, ethyl methacrylate, and isobutyl methacrylate; 20 to 48 wt % of at least one monomer selected from n-butyl acrylate, n-butyl methacrylate, ethyl acrylate and 2-ethylhexyl acrylate ; and 2 to 6 wt % of at least monomer selected from acrylic acid, methacrylic acid and beta carboxyethyl acrylate.

27. Composition according to claim 1 wherein said at least one soft polymer of the multistage polymer(s) is derived from a monomer composition comprising 50 to 78 wt % of at least one monomer selected from n-butyl acrylate, n-butyl methacrylate, ethyl acrylate, and 2-ethylhexyl acrylate; 20 to 48 wt % of at least one monomer selected from methyl methacrylate, styrene, ethyl methacrylate, and isobutyl methacrylate; and 2 to 6 wt % of at least one monomer selected from acrylic acid, methacrylic acid, and beta carboxyethyl acrylate.

28. Composition according to claim 1 wherein the non-film-forming polymer(s) is derived from a monomer composition(s) comprising 80 to 94 wt % of at least one monomer selected from methyl methacrylate, styrene, ethyl methacrylate and isobutyl methacryalate; 5 to 19 wt % of at least one monomer selected from n-butyl methacrylate, n-butyl acrylate, ethyl acrylate and 2-ethylhexyl acrylate; and 1 to 6 wt % of at least one monomer selected from acrylic acid and methacrylic acid.

29. Method for making a pigment-containing aqueous coating composition which method comprises:
  (1) forming a seeded multistage polymer latex(es) (A) by conducting a multistage polymer emulsion polymerisation(s) in the presence of a seed polymer latex(es), wherein:
    (i) the multistage polymer(s) of (A) comprises 50 to 90 wt % of at least one soft polymer phase having a Tg of $\leq 25°$ C., and 10 to 50 wt % of at least one hard polymer phase having a Tg of $\geq 30$ C.;
    (ii) the seed polymer(s) of (A) has a Tg which is at least 10° C. lower than the Tg of said at least one hard polymer phase of the multistage polymer:
    (iii) the multistage polymer latex(es) is formed in the presence of 1 to 20 wt % of the seed polymer(s) based on the weight of the multistage polymer(s);

(2) blending said seeded multistage polymer latex(es) (A) with a non-film-forming polymer latex(es) (B), the amount of (A) in the blend corresponding to 75 to 98% by weight of the polymers of (A) based on the total weight of the polymers of (A) and (B), and the amount of (B) in the blend corresponding to 2 to 25% by weight of polymer of (B) based on the total weight of the polymers of (A) and (B);

(3) formulating said seeded multistage polymer latex(es) (A) and said non-film-forming polymer latex(es) (B) blended therewith, with a particulate pigment in an amount to provide a pigment volume concentration (PVC) in a pigmented coating formed from the coating composition within the range of from 15 to 35%; and wherein further pigmented coatings formed from the coating composition have an elasticity value of at least 30%.

30. Method according to claim 29 wherein the seed polymer(s) has a Tg which is at least 10° C. than the Tg of said at least one soft polymer phase of the multistage polymer.

31. Method according to either claim 29 or claim 30 wherein the multistage polymer(s) employed bears amino functional groups incorporated by an imination reaction.

32. Method according to either claim 29 or claim 30 wherein all polymers of the composition are vinyl polymers made by an aqueous emulsion polymerisation process, and the amount of surfactant employed in the emulsion polymerisation(s) to make the multistage polymer(s) is $\leqq 4$ wt % based on the total weight of monomers used for both the soft and hard phase polymers of the multistage polymer(s).

33. A pigmented coating derived from an aqueous coating composition according to claim 1.

34. A pigmented coating according to claim 33 which has good early water and alkali resistance.

35. Method of coating a substrate which comprises applying an aqueous coating composition according to claim 1 to a substrate and causing or allowing the aqueous carrier medium of the composition to be removed.

36. Coated substrate which has been prepared by applying an aqueous composition according to claim 1 and causing or allowing the carrier medium of the composition to become removed.

37. Composition according to claim 26 or claim 27 wherein at least a proportion of the polymer-bound carboxylic acid groups is iminated to provide amino groups.

* * * * *